United States Patent [19]

Pawloski

[11] 3,927,004

[45] Dec. 16, 1975

[54] SUBSTITUTED PYRIDINE PHOSPHONOTHIOATES

[75] Inventor: Chester E. Pawloski, Bay City, Mich.

[73] Assignee: The Dow Chemical Company, Midland, Mich.

[22] Filed: Apr. 1, 1974

[21] Appl. No.: 457,023

[52] U.S. Cl. ... 260/294.8 K; 260/296 R; 260/297 P; 424/263
[51] Int. Cl.² ........................................ C07D 213/56
[58] Field of Search ....... 260/294.8 K, 297 P, 296 R

[56] References Cited

UNITED STATES PATENTS 3,478,037   11/1969   Fest et al. .................... 260/294.8 K

*Primary Examiner*—Alan L. Rotman
*Attorney, Agent, or Firm*—S. Preston Jones

[57] ABSTRACT

Substituted pyridinyl phosphonothioates prepared by the reaction of selected substituted pyridinol and phosphonochloridothioate reactants. The novel compounds are useful in the control of certain insect organisms.

10 Claims, No Drawings

SUBSTITUTED PYRIDINE PHOSPHONOTHIOATES

SUMMARY OF THE INVENTION

This invention relates to certain novel substituted pyridinyl phosphonothioates selected from the group consisting of 0-(3,5-dichloro-6-propoxy-2-pyridinyl) 0-methyl phenylphosphonothioate, 0-(2,4,6-trichloro-3-pyridinyl) 0-methyl phenylphosphonothioate, 0-(6-methyl-2-pyridinyl) 0-methyl phenylphosphonothioate, 0-(6-tert. butyl-2-pyridinyl) 0-methyl phenylphosphonothioate, 0-(5-methyl-2-pyridinyl) 0-methyl phenylphosphonothioate, 0-(5-chloro-3-methyl-2-pyridinyl) 0-methyl phenylphosphonothioate, 0-(6-methoxy-2-methyl-3-pyridinyl) 0-methyl phenylphosphonothioate, 0-(6-methyl-3-pyridinyl) P-phenyl N-methylphosphonamidothioate and 0-(6-chloro-2-pyridinyl) P-phenyl N-methylphosphonamidothioate. Certain of the compounds of the present invention have been found to be active against insects such as copper bottle fly; others are active against western-spotted cucumber beetle, houseflies and two-spotted spider mites.

The compounds of the present invention, hereinafter referred to for convenience as active ingredients, are oily liquids or solids at ambient temperatures and are soluble in usual organic carriers such as, for example, carbon tetrachloride, acetone, toluene, methylene chloride, dimethylformamide and the like. Preferred active ingredients of the present invention include those selected from the group consisting of 0-(3,5-dichloro-6-propoxy-2-pyridinyl) 0-methyl phenylphosphonothioate, 0-(6-methyl-2-pyridinyl) 0-methyl phenylphosphonothioate, 0-(5-methyl-2-pyridinyl) P-phenyl N-methylphosphonamidothioate and 0-(5-chloro-3-methyl-2-pyridinyl) 0-methyl phenylphosphonothioate, hereinafter referred to as compounds A, B, C, D and E respectively. Another preferred group of compounds include those selected from the group consisting of 0-(6-tert. butyl-2-pyridinyl) 0-methyl phenylphosphonothioate and 0-(6-methoxy-2-methyl-3-pyridinyl) 0-methyl phenylphosphonothioate, hereinafter referred to as compounds F and G, respectively. An additional preferred class of compounds include those selected from the group consisting of 0-(6-methyl-2pyridinyl) 0-methyl phenylphosphonothioate, 0-(6-tert. butyl-2-pyridinyl) 0-methyl phenylphosphonothioate and 0-(5-methyl-2-pyridinyl) 0-methyl phenylphosphonothioate. Another preferred class of compounds includes those selected from the group consisting of 0-(3,5-dichloro- 6-propoxy-2-pyridinyl) 0-methyl phenylphosphonothioate and 0-(5-chloro-3-methyl-2-pyridinyl) 0-methyl phenylphosphonothioate. In another embodiment, 0-(6-methyl-3-pyridinyl) P-methyl N-methylphosphonamidothioate (hereinafter compound H) is a preferred compound.

The active ingredients of the present invention are prepared by the reaction of a selected substituted pyridinol and an 0-methyl phenylphosphonochloridothioate or 0-methyl N-methylphosphonamidochloridothioate reactant in the presence of an inert organic carrier. Usually, an alkaline salt of the selected pyridinol is employed. The substituted pyridinol reactants employed to prepare the compounds of the present invention are obvious in view of the active ingredients named hereinabove and are readily available or can be prepared according to procedures which are known or are analogous to those set forth in the known literature. The corresponding substituted phosphonothioate reactants are similarly available or prepared.

The reaction is preferably carried out in the presence of an inert carrier medium such as, for example, benzene, toluene, xylene, acetone, methylisopropyl ketone, methylisobutyl ketone, acetonitrile, dimethylformamide, methylene chloride and the like. The reaction is further preferably carried out in the presence of an acid acceptor. For this purpose, the customary acid-binding agents can be employed. Those that are particularly suitable include, for example, alkali metal alcoholates and carbonates; such as potassium and sodium methylate or ethylate, sodium and potassium carbamate and tertiary amines such as, for example, triethylamine, trimethylamine, pyridine and the like. A small amount of a catalyst, such as mercurous chloride, preferably trimethylbenzylammonium chloride, and the like is also preferably employed.

Ordinarily, a solution or suspension of a salt of the substituted 2-pyridinol reactant is first prepared and this is subsequently reacted with an appropriate substituted phosphonochloridothioate. The reactants, as well as the auxiliary substances (acid-acceptors), are, in general, employed in stoichiometric amounts. The reaction temperature can be varied over a fairly wide range and, in general, the reaction is carried out at temperatures of from about 0° to about 100°C (or the boiling point of the reaction mixture). Generally, the reaction is carried out, with agitation, for a period of from about 1 to about 8 hours. The crude product is usually obtained in the form of viscous oils which can be freed from volatile impurities by heating at moderately elevated temperatures under reduced pressure. The refractive index can be used as a more precise determination of the product characterization.

The following non-limitative examples further illustrate the invention.

EXAMPLE 1

14.0 Grams (0.093 mole) of 6-tert. butyl-2-pyridinol, 2.0 grams (0.093 mole) of 0-methyl phenylphosphonochloridothioate, 13 grams of potassium carbonate and 0.1 gram of $HgCl_2$ were mixed with 250 milliliters (ml) of acetonitrile and the resulting reaction mixture was heated, with stirring, at temperatures of about 50°–55°C for a period of about six hours. Following the reaction period, the reaction mixture was cooled, filtered and the solvent distilled therefrom under reduced pressure. The resulting oily residue was mixed with about 300 ml of methylene chloride and the resulting mixture washed with a 2 percent sodium hydroxide solution. The oily organic layer was washed with water, dried over sodium sulfate and distilled to remove the solvent. As a result of such operations, the desired 0-(6-tert. -butyl-2-pyridinyl) 0-methyl phenylphosphonothioate product was obtained as an amber oil having a refractive index $n_D^{25°\ C}$ of 1.5740.

Other active ingredients of the present invention are similarly prepared according to the teachings of the specification and the procedures of Example 1 above by employing the appropriate substituted pyridinol reactant and O-methyl phenylphosphonochloridothioate. Such other active ingredients include the following:

0-(3,5-dichloro-6-propoxy-2-pyridinyl) 0-methyl phenylphosphonothioate, having a refractive index $n_D^{25°\ C} = 1.5964$;

0-(2,4,6-trichloro-2-pyridinyl) 0-methyl phenylphosphonothioate, having a refractive index $n_D^{25°C} = 1.6126$;

0-(5-methyl-2-pyridinyl) 0-methyl phenylphosphonothioate, having a refractive index $n_D^{25°C} = 1.5910$;

0-(6-methoxy-2-methyl-3-pyridinyl) 0-methyl phenylphosphonothioate, having a refractive index $n_D^{25°C} = 1.5854$;

0-(5-chloro-3-methyl-2-pyridinyl) 0-methyl phenylphosphonothioate, having a refractive index $n_D^{25°C} = 1.6001$;

0-(6-methyl-3-pyridinyl) P-phenyl N-methylphosphonamidothioate, having a refractive index $n_D^{25°C} = 1.6082$, and 0-(6-chloro-2-pyridinyl) P-phenyl N-methylphenylphosphonamidothioate, having a refractive index $n_D^{25°C} = 1.6169$.

The various active ingredients have been found to be active against certain insect organisms. Thus, for example, Compounds A, B, C, D and E, set forth hereinabove, have been found to be active against western spotted cucumber beetles. Compounds F and G have been found to be active against houseflies and 0-(2,4,6-trichloro-3-pyridinyl) 0-methyl phenylphosphonothioate has been found to be active against copper bottle fly. Compound H has been found to give control of two-spotted spider mites. For such uses, unmodified active ingredients of the present invention can be employed. However, the present invention embraces the use of a pesticidally effective amount of the active ingredients in composition form with an inert material known in the art as an adjuvant or carrier in solid or liquid form. Such compositions are employed to contact the insect organism and/or its habitat. Thus, for example, an active ingredient can be dispersed on a finely divided solid and employed therein as a dust. Also, the active ingredients, as liquid concentrates or solid compositions comprising one or more of the active ingredients, can be dispersed in water, typically with the aid of a wetting agent, and the resulting aqueous dispersion employed as a spray. In other procedures, the active ingredient can be employed as a constituent of organic liquid compositions, oil-in-water and water-in-oil emulsions, or water dispersion, with or without the addition of wetting, dispersing, or emulsifying agents.

Suitable adjuvants of the foregoing type are well known to those skilled in the art. The methods of applying the solid or liquid pesticidal formulations similarly are well known to the skilled artisan.

As organic solvents used as extending agents there can be employed hydrocarbons, e.g., benzene, toluene, xylene, kerosene, diesel fuel, fuel oil, and petroleum naphtha, ketones such as acetone, methyl ethyl ketone and cyclohexanone, chlorinated hydrocarbons such as carbon tetrachloride, chloroform, trichloroethylene, and perchloroethylene, esters such as ethyl acetate, amyl acetate and butyl acetate, ethers, e.g., ethylene glycol monomethyl ether and diethylene glycol monomethyl ether, alcohols, e.g., methanol, ethanol, isopropanol, amyl alcohol, ethylene glycol, propylene glycol, butyl carbitol acetate and glycerine. Mixtures of water and organic solvents, either as solutions or emulsions, can be employed.

The active ingredients can also be applied as aerosols, e.g., by dispersing them in air by means of a compressed gas such as dichlorodifluoromethane or trichlorofluoromethane and other Freons and Genetrons, for example.

The active ingredients of the present invention can also be applied with adjuvants or carriers such as talc, pyrophyllite, synthetic fine silica, attapulgus clay, kieselguhr, chalk, diatomaceous earth, lime, calcium carbonate, bentonite, fuller's earth, cottonseed hulls, wheat flour, soybean flour, pumice, tripoli, wood flour, walnut shell flour, redwood flour and lignin.

As stated, it is frequently desirable to incorporate a surface active agent in the compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylbenzene sulfonates having 10 to 18 carbon atoms in the alkyl group, alkylphenol ethylene oxide condensation products, e.g., p-isooctylphenol condensed with 10 ethylene oxide units, soaps, e.g., sodium stearate and potassium oleate, sodium salt of propylnaphthalene sulfonic acid, di(2-ethylhexyl)-ester of sodium sulfosuccinic acid, sodium lauryl sulfate, sodium decane sulfonate, sodium salt of the sulfonated monoglyceride of coconut fatty acids, sorbitan sesquioleate, lauryl trimethyl ammonium chloride, octadecyl trimethyl ammonium chloride, polyethylene glycol lauryl ether, polyethylene glycol esters of fatty acids and rosin acids, e.g., Ethofat 7 and 13, sodium N-methyl-N-oleyl taurate, Turkey Red Oil, sodium dibutyl naphthalene sulfonate, sodium lignin sulfonate, polyethylene glycol stearate, sodium dodecylbenzene sulfonate, tertiary dodecyl polyethylene glycol thioether (nonionic 218), long chain ethylene oxide-propylene oxide condensation products, e.g., Pluronic 61 (molecular weight 1000), polyethylene glycol ester of tall oil acids, sodium octyl phenoxyethoxyethyl sulfate, trix(polyoxyethylene) sorbitan monostearate (Tween 60), and sodium dihexyl sulfosuccinate.

The active ingredients of the invention may be present in the formulations in admixture with other active compounds.

The formulations contain, in general, from about 0.0001 to 95; preferably from about 0.01 to about 90, percent by weight of active compound. The concentrations of active ingredient varies depending upon the intended use. In general, concentrations of at least about 0.0006 percent are employed for control of western spotted cucumber beetle while concentrations of at least about 0.0001 percent are employed for control of copper bottle fly. Concentrations of at least about 0.001 percent 0.04 are employed for control of houseflies and two-spotted spider mites, respectively. Such formulations can be applied by spraying, dusting, etc.

In view of the foregoing and the following disclosures, one skilled in the art can readily determine the optimum rate to be applied in any particular case. So as to illustrate the properties of the active ingredients, a group of controlled experiments is described below.

EXAMPLE 2

Separate larval media samples comprising calf feces were mixed with 100 parts per million (ppm) of one of the test compounds, F and G, respectively, on silica gel. The resulting mixture was innoculated with approximately one-hundred resistant housefly eggs and then stored at room temperature for a period of 48 hours, after which observations were made for the presence or absence of larvae. In such operations, the test compounds were found to completely inhibit the hatching of the eggs.

EXAMPLE 3

One and one-half milliliters of an acetone solution containing 1.0 ppm of 0-(6-methoxy-2-methyl-3-pyridinyl) 0-methyl phenylphosphonothioate was innoculated and absorbed onto cotton plugs and placed into vials. The treated plugs are allowed to stand for 24 hours to allow the acetone to evaporate, thereby leaving the active ingredient on the cotton plug. One milliliter of bovine serum in the innoculated onto the cotton plugs as a feeding media and 50–100 first stage copper bottle fly maggots at 1–6 hours of age are placed on the treated plug. The vials are then capped with cotton and maintained at temperatures of 82°–84°F and 80 percent relative humidity for a period of 24 hours. The vials are then examined and mortality of larvae determined. In such operations, the above test ingredient was found to give complete control of copper bottle fly larvae at a concentration of 1.0 ppm.

EXAMPLE 4

Separate acetone test solutions containing various amounts (ppm by weight of soil) of one of the active ingredients of the present invention (i.e., Compounds A, B, C, D and E set forth hereinabove, and 0-(2,4,6-trichloro-3-pyridinyl) 0-methyl phenylphosphonothioate, hereinafter Compound I) were prepared and applied to 100 gram samples of soil. After the soil was air-dried, one-half milliliter of a solution containing 70–80 western spotted cucumber beetle eggs was applied to portion of the treated soil sample. The layer of eggs was covered with a layer of the treated soil and a corn seed placed on top of such layer. The remainder of the treated soil portion was then placed over the corn seed. The treated soil sample was watered and maintained under conditions conducive to growth for a period of from about 9–10 days. The surface of the treated soil sample was then examined for the presence of live larvae and the presence or absence of larvae noted. The said sample is then emptied and the root and stem of the corn plant checked for damage. Similar comparitive trials with related compounds and with untreated checks were also run. As a result of such operations, it was found that Compounds A, B, C, D, E and I gave complete control of Western spotted cucumber beetle larvae with no damage to corn roots at concentrations of 25.0 ppm. Compound C and I similarly gave complete control at a concentration of 6.0 ppm with no damage to corn roots. In comparative operations with 0-(6-methyl-3-pyridinyl) 0-methyl phenylphosphonothioate and 0-(2-chloro-6-methyl-3-pyridinyl) 0-methyl phenylphosphonothioate, it was found that neither compound gave control of the larvae or prevented corn root damage at concentrations of 25.0 parts per million, respectively. The inactivity of such related compounds demonstrates the unexpected and superior insecticidal properties of the active ingredients of the present invention.

EXAMPLE 5

Fifty to one-hundred adult and eggs of two-spotted spider mite are placed on a host plant and the infested plants are dipped in an aqueous dispersion containing 400 ppm by weight of 0-(6-methyl-3-pyridinyl) P-phenyl N-methylphosphonamidothioate. An additional application of the test solution is made in the root area of the host plant. The treated plants are then maintained under conditions conducive to growth for a period of six days and then examined, along with untreated controls, to determine mite mortality. As a result of such operations, the test ingredient was found to give substantial control of two-spotted spider mites at a concentration of 400 ppm.

Although the invention is described with respect to specific modifications, the details thereof are not to be construed as limitations except to the extent indicated in the following claims:

I claim:

1. A compound selected from the group consisting of 0-(3,5-dichloro-6-propoxy-2-pyridinyl) 0-methyl phenylphosphonothioate; 0-(6-methyl-2-pyridinyl) 0-methyl phenylphosphonothioate, 0-(5-methyl-2-pyridinyl) 0-methyl phenylphosphonothioate, 0-(5-chloro-3-methyl-2-pyridinyl) 0-methyl phenylphosphonothioate and 0-(6-chloro-2-pyridinyl) P-phenyl N-methylphosphonamidothioate.

2. A compound according to claim 1 which is 0-(3,5-dichloro-6-propoxy-2-pyridinyl) 0-methyl phenylphosphonothioate.

3. A compound according to claim 1 which is 0-(6-methyl-2-pyridinyl) 0-methyl phenylphosphonothioate.

4. A compound according to claim 1 which is 0-(5-methyl-2-pyridinyl) 0-methyl phenylphosphonothioate.

5. A compound according to claim 1 which is 0-(5-chloro-3-methyl-2-pyridinyl) 0-methyl phenylphosphonothioate.

6. A compound according to claim 1 which is 0-(6-chloro-2-pyridinyl) P-phenyl N-methylphosphonamidothioate.

7. A compound selected from the group consisting of 0-(6-tert. butyl-2-pyridinyl) 0-methyl phenylphosphonothioate and 0-(6-methoxy-2-methyl-3-pyridinyl) 0-methyl phenylphosphonothioate.

8. A compound according to claim 7 which is 0-(6-methoxy-2-methyl-3-pyridinyl) 0-methyl phenylphosphonothioate.

9. A compound according to claim 7 which is 0-(6-tert. butyl-2-pyridinyl) 0-methyl phenylphosphonothioate.

10. A compound according to claim 1 which is 0-(6-Methyl-3-pyridinyl)-P-phenyl N-methylphosphonamidothioate.

* * * * *

UNITED STATES PATENT AND TRADEMARK OFFICE
CERTIFICATE OF CORRECTION

PATENT NO. : 3,927,004
DATED : December 16, 1975
INVENTOR(S) : Chester E. Pawloski It is certified that error appears in the above-identified patent and that said Letters Patent are hereby corrected as shown below:

Col. 1, line 33, after O-(5-methyl-2-pyridinyl), insert --O-methyl phenylphosphonothioate, O-(6-chloro-2-pyridinyl)--.

Col. 1, line 46, after the number two, insert -- - --.

Col. 3, line 27, insert after the word give --good--.

Col. 4, line 49, insert after the word to --about--.

Col. 5, line 50, delete "comparitive" insert --comparative--.

Col. 6, Claim 10, delete "A compound according to claim 1 which is".

Signed and Sealed this

Nineteenth Day of October 1976

[SEAL]

Attest:

RUTH C. MASON
Attesting Officer

C. MARSHALL DANN
Commissioner of Patents and Trademarks